Patented Mar. 4, 1952

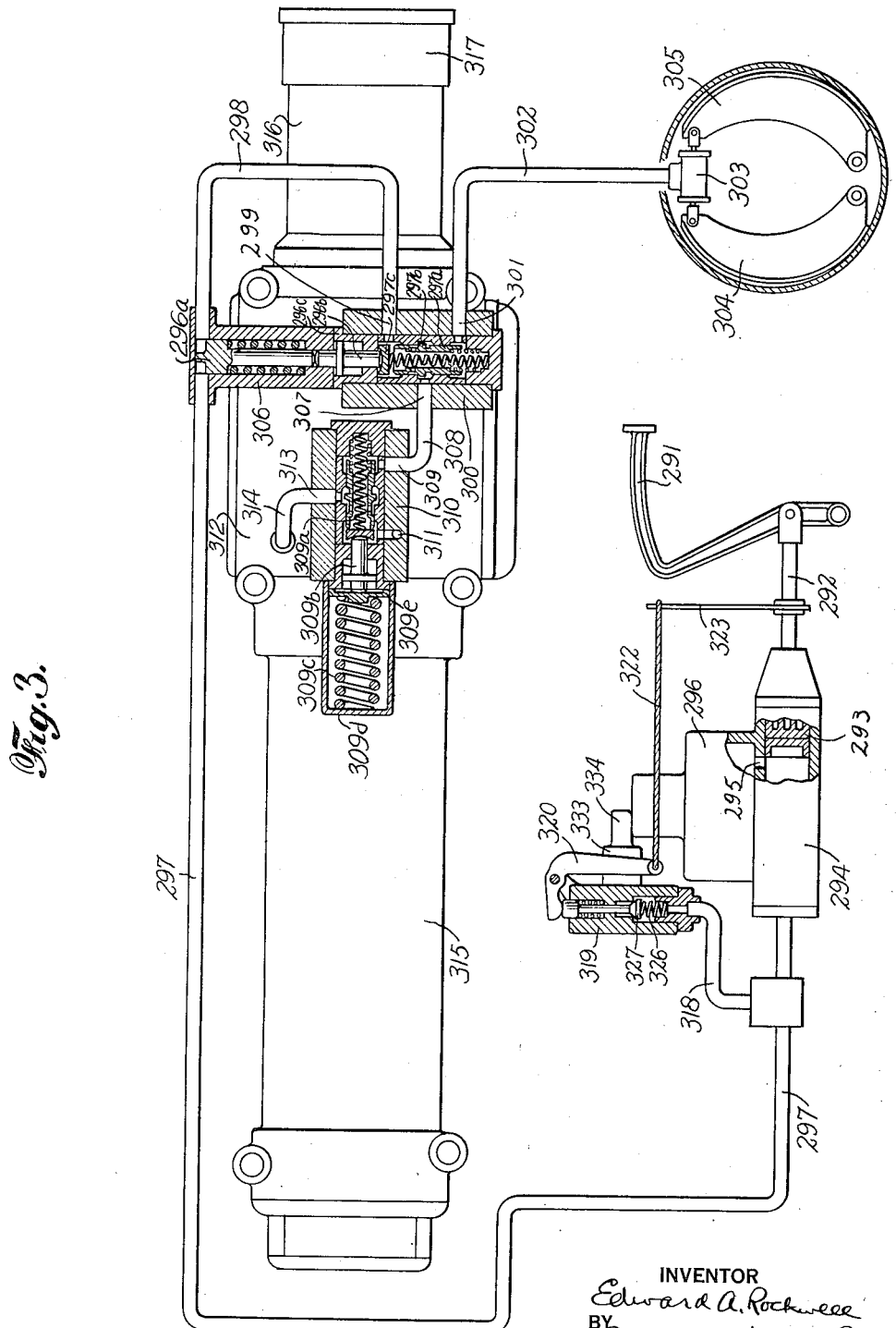

2,588,048

UNITED STATES PATENT OFFICE 2,588,048

PRESSURE CONVERTER SYSTEM AND APPARATUS THEREFOR

Edward A. Rockwell, Shaker Heights, Ohio, assignor to The New Britain Machine Company, New Britain, Conn., a corporation of Connecticut Application February 17, 1943, Serial No. 476,248, now Patent No. 2,410,750, dated November 5, 1946, which is a division of application Serial No. 312,356, January 4, 1940, now Patent No. 2,331,800, dated October 12, 1943. Divided and this application November 28, 1945, Serial No. 631,263. In Canada December 30, 1940

13 Claims. (Cl. 60—54.5)

My invention relates particularly to an apparatus designed for controlling the application of power for the operation of different parts or accessories of automotive vehicles, as, for example, automobiles, aeroplanes, railroad cars, mine locomotives, etc.

This application is a division of my co-pending application Ser. No. 476,248, filed February 17, 1943, now Patent No. 2,410,750, upon Controlling System for the Application of Power, which is a division of application Ser. No. 312,356, filed January 4, 1940, now Patent No. 2,331,800, granted October 12, 1943.

The object of my invention is to provide a system whereby the different parts of automotive vehicles may be operated in an advantageous manner so as to maintain adequate control over the same at all times. Another object is to provide an apparatus of this character, in accordance with which the part to be operated may be moved into position initially by means of a fluid applied at one pressure, and thereafter operated to cause the performance of work by said part by fluid at another pressure, this being accomplished preferably by moving the work performing part by a manual pressure followed, upon the increase of manual pressure, by another higher pressure. My invention is adapted to be applied, not only for the operation of heavy-duty parts, as, for instance, on heavy trucks, requiring a considerable volume of pressure fluid for the operation of the same, but also for the operation of relatively light parts on aeroplanes and other automotive vehicles, such, for instance, as light trucks, etc. Still another object is to provide an unloader valve following the application of the manual pressure, etc. Further objects of my invention will appear from the detailed description of the same hereinafter.

While my invention is capable of embodiment in many different forms, I have shown only certain embodiments thereof in the accompanying drawings, in which—

Fig. 3 is a diagrammatic representation of the circuit shown in Fig. 1.

Referring to the system shown in Patent No. 2,331,880 which contains important elements utilized in the system described herein, a system is provided for first applying a modulated low pressure and for thereafter controlling the application of a modulated high pressure thereby, involving an accumulator as described in said patent.

Figure 1:
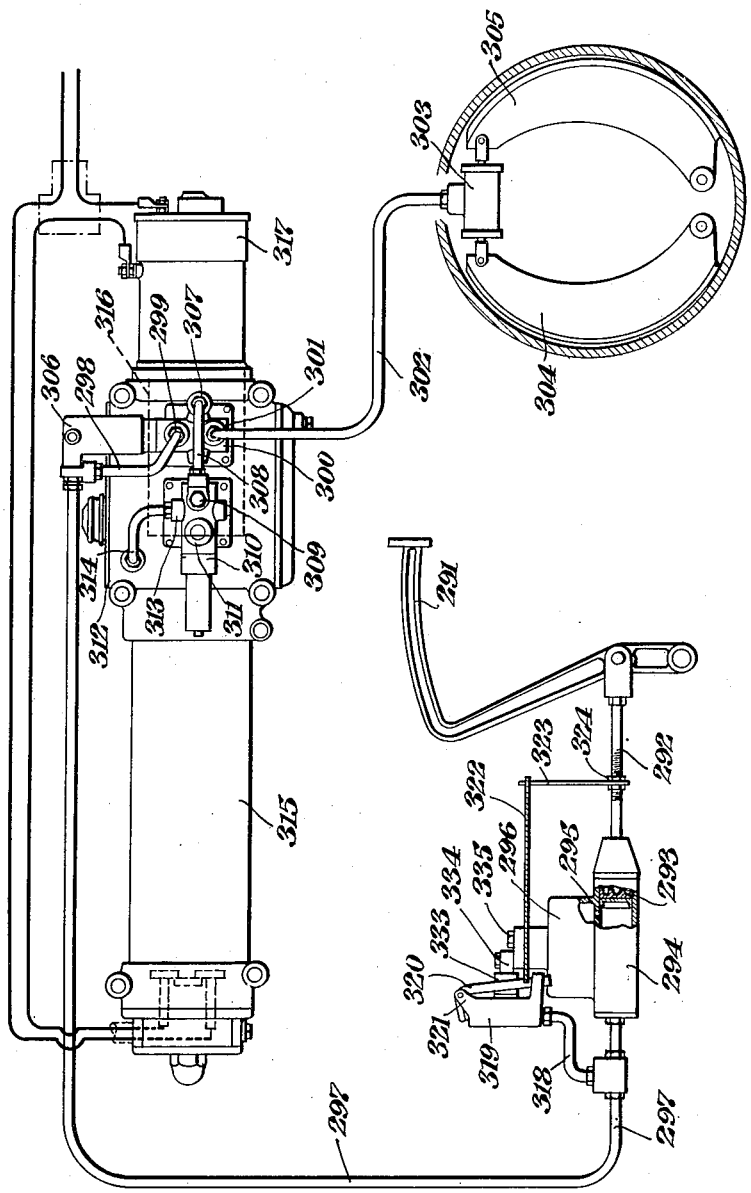
Fig. 1 is an elevation of a further modification of the system in which a manual fluid pressure is provided for thereafter applying a modulated higher pressure.
Figure 2:
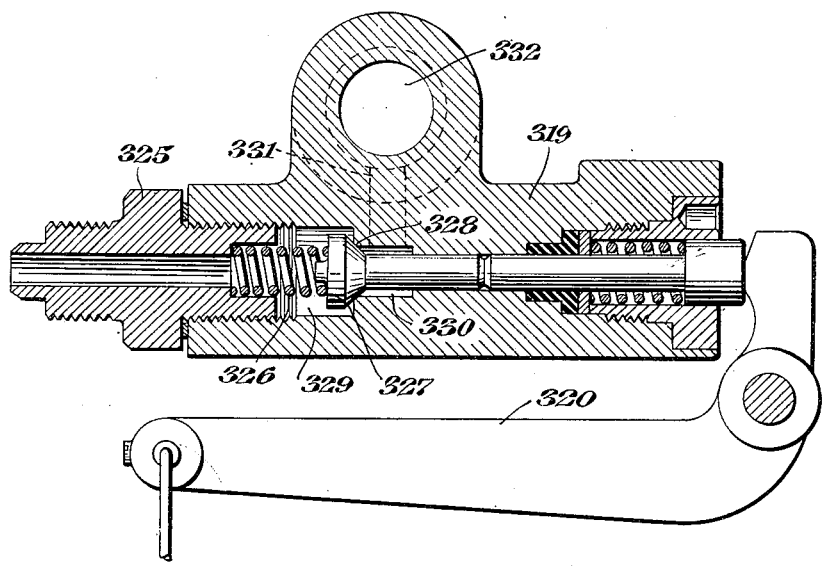
Fig. 2 is a longitudinal section of an unloader valve used therewith.

In the form of my invention as shown in Figs. 1, 2 and 3 I have provided a system for controlling the operation of the parts of automotive vehicles and which is designed for installation on units involving heavy duty. In this instance, means is provided for initially moving the parts into position by merely a manual force applied hydraulically after which a high pressure liquid is brought into action thereby to apply the braking force. Thereafter the movement of the brake is controlled by a differential brake and the manual pressure. In this instance a foot pedal 291 is pressed to the left in Fig. 1 to operate a rod 292 attached to a piston 293 in a master cylinder 294 having an inlet port 295 for liquid from a supply tank 296. The forward movement to the left, in Fig. 1, of a piston 293 will force the liquid out of a cylinder 294 into a pipe 297 containing a spring retracted differential plunger 296a having an auxiliary plunger 296b in a sleeve casing 296c and thence to a pipe 298 into a low pressure port 299 on a hydraulic operating unit and modulator valve 300, which is constructed the same as the modulator valve further described in said patent, so that the liquid initially passes from the pipe 298 through a tubular valve 297a and thence to a port 301 and a pipe 302 to a brake-operating cylinder 303 for moving the brake shoes 304 and 305 into position. This movement of the liquid under manual pressure will continue until the brake shoes 304 and 305 are moved entirely into position, after which the pressure in the pipe 302 will increase to such an extent that the liquid from the pipe 297 will operate a hydraulic unit 306 in which the plunger 296a is located, and thereby operate the tubular valve 297a, having a high pressure peripheral inlet valve 297b and an end closure disc valve 297c operated by the plunger rod 296b in the sleeve casing 296c located in modulator valve 300 so as to cut off the entry of liquid from the pipe 298 while modulated high pressure liquid is thereafter delivered by the tubular valve 297a to the pipe 302 and thence to the brakes to apply the braking force thereto. This high pressure liquid is delivered to the modulator valve 300 through a port 307 from a pipe 308 and is supplied to said pipe from a port 309 in a regulator pressure valve 310 constructed the same as the regulator pressure valve described in the said patent, having a tubular valve 309a like the tubular valve 297a operated by a plunger 309b like the plunger 296b and controlled by a biased spring 309c in a shell 309d having a spring-pressed plate 309e. The exhaust or low pressure from the regulator valve 310 passes out by a low pressure port 311 to a tank 312. Furthermore, the high pressure liquid is supplied to said regulator valve 310 by a port 313 from a check valve controlled port 314 which is connected to the discharge side of an accumulator 315 which contains a check valve constructed the same as the accumulator described, having a check valve in said patent, and the liquid under pressure is supplied to said accumulator 315 by means of a rotary pump 316 located in the tank 312 and driven by an electric motor 317, the said motor and pump being constructed and arranged the same as the motor and pump described in said patent. The same type of electric circuit is used thereon as described in said patent also. In the return movement of the pedal 291, means is provided for unloading the manual pressure liquid in the pipe 297 quickly to provide uniformity of action at all times by means of a branch pipe 318 the valve in which is connected to an unloader valve casing 319 which is opened automatically by a bell crank lever 320 pivoted on ears 321 on the valve casing 319, the lower end of the bell crank lever 320 being connected by a cable 322 to an arm 323 held in place by nuts 324 on the rod 292. The unloader valve within the casing 319 is comprised of a fitting 325, Fig. 2, communicating with the pipe 318, which fitting is screw-threaded in the casing 319. The said fitting 325 supports a spring 326 to hold upwardly a valve 327 against a seat 328 within said casing 319. A chamber 329 is provided, in which the valve 327 moves and when the said valve is unseated it communicates with a chamber 330 leading by a passageway 331 to a port 332 and a pipe 333 fastened to a fitting 334 which communicates with the upper portion of the tank 296. A filler cap 335 is also provided on the top of said tank 296. By this means, when the foot is taken off the pedal 291 the liquid in the pipe 297 is automatically unloaded quickly into the tank 296.

In the form of my invention as shown in the figures, manual pressure is utilized for bringing the brake shoes into position, after which a high pressure is brought into action for applying the braking force to the brakes. For this purpose, when the foot pedal 291 is manually operated the piston 293 traps some of the liquid received from the port 295 and then forces the same through the pipe 297 and the pipe 298 past the open valve 297a and through the pipe 302 to move the brake shoes 304 and 305 into position. As the pressure of this liquid increases, the hydraulic unit 306 is operated to close the valve 297c, thus unseating the valve 297a and admitting high pressure liquid received from the accumulator 315 to the pipe 302 for applying the force of the high pressure liquid so as to obtain the desired braking effect upon the braking shoes. After the high pressure liquid has been admitted to the brake through the pipe 302 the brake is controlled by the differential between the reaction of the increased pressures in the pipe 302 and the manual pressure being applied to the upper end of the plunger 296a, inasmuch as said increased pressures react upwardly through the plunger 296a against the manual pressures applied to the top thereof. This high pressure liquid, by means of the valve 297a in the desired increments, enables the modulated pressure to be utilized in the on or off modulation so as to obtain a carefully and exactly modulated braking effect, that is to say a braking effect which is accurately coordinated to the manual force applied to the manual actuating means. Upon the release of the manual pressure the liquid flows in the reverse direction through the pipes 302, 298 and 297, and, due to the unloader valve 319, is discharged quickly through the passageway 332 into the supply tank 296 ready to be used again in the same way when the manual force is again applied to the pedal 291. This unloader valve is quite similar in operation to the low-to-high pressure converter valve operation described in said patent, especially because of the lost-motion connection to said valves.

While I have described my invention above in detail I wish it to be understood that many changes may be made therein without departing from the spirit of the same.

I claim:

1. In combination, a hydraulic connection, to contain a pressure liquid, adapted to be connected to a part to be operated, means for accumulating intermittently a body of liquid under a substantially uniform superatmospheric pressure and a valve means, including a cylindrical valve member having a passageway therethrough, actuated by the pressure of said pressure liquid, upon the increase in pressure in said connection, for cutting off the pressure liquid from said hydraulic connection to the part to be operated and delivering the accumulated pressure to said part, through which valve means both said pressure liquid and the accumulated pressure liquid pass by means of said passageway.

2. In combination, a hydraulic connection, to contain a pressure liquid, adapted to be connected to a part to be operated, means for accumulating intermittently a body of liquid under a substantially uniform superatmospheric pressure and a valve means, including a cylindrical valve member having a passageway therethrough, actuated by the pressure of said pressure liquid, upon the increase in pressure in said connection, for cutting off the pressure liquid from said hydraulic connection to the part to be operated and modulatingly deliver the accumulated pressure to said part, through which valve means both said pressure liquid and the accumulated pressure liquid pass by means of said passageway.

3. In combination, a hydraulic connection, to contain a pressure liquid, adapted to be connected to a part to be operated, means for accumulating intermittently a body of liquid under a substantially uniform superatmospheric pressure, a device for delivering a regulated pressure therefrom, and a valve means, including a cylindrical valve member having a passageway therethrough, actuated by the pressure of said pressure liquid, upon the increase in pressure in said conection, for cutting off the pressure liquid from said hydraulic connection to the part to be operated and delivering the accumulated pressure to said part, through which valve means both said pressure liquid and the accumulated pressure liquid pass by means of said passageway.

4. In combination, a hydraulic connection, to contain a pressure liquid, adapted to be connected to a part to be operated, means for accumulating intermittently a body of liquid under a substantially uniform superatmospheric pressure, a device for delivering a regulated pressure therefrom, and a valve means, including a cylindrical valve member having a passageway therethrough, actuated by the pressure of said pressure liquid, upon the increase in pressure in said connection, for cutting off the pressure liquid from said hydraulic connection to the part to be operated and modulatingly deliver the accumulated pressure to said part, through which valve means both said pressure liquid and the accumulated pressure liquid pass by means of said passageway.

5. In combination, a device to be moved, means for applying a primary pressure to said device, a connection adapted to be connected to a source of high pressure power, and a pressure-operated plunger valve means for controlling the application of increased pressure to the device, including an effective differential area and a hydraulic passageway adapted to be controlled by a differential between the reaction of an intermittently acting movable body of liquid producing the increased pressure applied to said device and the primary pressure through which valve means the primary pressure and the high pressure pass.

6. In combination, a device to be moved, means for applying a primary pressure to said device, a connection adapted to be connected to a source of high pressure power, and a pressure-operated differential plunger valve means for controlling the application of increased pressure to the device, having areas subject to said primary pressure and the increased pressure applied to said device, including an effective differential area and a hydraulic passageway cooperating with all of said areas adapted to be controlled by a differential between the reaction of an intermittently acting movable body of liquid producing the increased pressure applied to said device and the primary pressure through which valve means the primary pressure and the high pressure pass.

7. In combination, a device to be moved, pressure-producing means for applying a primary pressure to said device, a connection adapted to be connected to a source of power applied high pressure fluid, a pressure operated plunger means, having areas subject to said first mentioned pressure and the increased pressure applied to said device, for controlling the application of increased pressure to the device, adapted to be controlled by a differential between the reaction of the increased pressure applied to said device and the primary pressure, and an initially biased valve means through which both the primary pressure and the high pressure fluid pass, associated with said plunger to close off the high pressure fluid but adapted to cut off the primary pressure liquid supply to said device when said increased pressure is being applied and accordingly to open when the primary pressure is greater than the power applied pressure applied to said device.

8. In combination, a device to be moved, pressure-producing means for applying a primary pressure to said device, a connection adapted to be connected to a source of power applied high pressure, a pressure operated differential plunger means, having areas subject to said primary pressure and the increased pressure applied to said device, for controlling the application of increased pressure to the device, adapted to be controlled by a differential between the reaction of the increased pressure applied to said device and the primary pressure, and an initially biased valve means through which both the primary pressure and the high pressure fluid pass, connected to said plunger to close off the high pressure fluid but adapted to cut off the primary pressure liquid supply to said device when said increased pressure is being applied and to open when the primary pressure is greater than the power applied pressure applied to said device.

9. In combination, a device to be moved, pressure-producing means for applying a primary pressure to said device, a connection adapted to be connected to a source of power applied high pressure fluid, a pressure operated plunger means, having areas subject to said primary pressure and the increased pressure applied to said device, for controlling the application of increased pressure to the device, adapted to be controlled by a differential between the reaction of a substantially static body of liquid producing the increased pressure applied to said device and the primary pressure, and an initially biased valve means, open in released position for liquid compensation, through which valve means both the primary pressure and the high pressure fluid pass, adapted to cut off the primary pressure liquid supply to said device when said increased pressure is being applied and accordingly to open when the primary pressure is greater than the power applied pressure applied to said device.

10. In combination, a device to be moved, pressure-producing means for applying a primary pressure to said device, a connection adapted to be connected to a source of power applied high pressure fluid, a pressure operated differential plunger means for controlling the application of increased pressure to the device, having areas subject to said primary pressure and the increased pressure applied to said device, adapted to be controlled by a differential between the reaction of a substantially static body of liquid producing the increased pressure applied to said device and the primary pressure, and an initially biased tubular valve means, open in released position for liquid compensation, through which valve means both the primary pressure and the high pressure fluid pass, adapted to cut off the primary pressure liquid supply to said device when said increased pressure is being applied and accordingly to open when the primary pressure is greater than the power applied pressure applied to said device.

11. In combination, a device to be moved for the control and operation of a friction member, selective means for applying a primary pressure to said device, a connection adapted to be connected to a hydraulic pump comprising upon movement of the selective means a source of high pressure power for cooperating with the means for applying said primary pressure, and a pressure-operated plunger valve means for selectively controlling the application of said pressures to the device, including an effective differential area, adapted to be controlled by a differential between the reaction of an intermittently acting movable body of liquid producing the increased pressure applied to said device and the primary pressure through which valve means the primary pressure and high pressure react, whereby both primary pressure and high pressure are delivered directly through to the device from said valve means.

12. In combination, a device to be moved, a pressure-producing means for applying a primary pressure to said device, a connection adapted to be connected to a source of power applied high pressure fluid, a pressure operated plunger means, having areas subject to said first mentioned pressure and the increased pressure applied to said device, for controlling the application of increased pressure to the device, adapted to be controlled by a differential between the reaction of the increased pressure applied to said device and the primary pressure, and an initially biased valve means, having a hydraulic conduit supply from said area subject to the first mentioned pressure, through which valve means both the primary pressure and the high pressure fluid pass, associated with said plunger to close off the high pressure fluid but adapted to cut off the primary pressure liquid supply to said device when said increased pressure is being applied and accordingly to open when the primary pressure is greater than the power applied pressure applied to said device.

13. In combination, a hydraulic connection for a device to be moved, means for applying a primary pressure to such device by means of said connection, a connection adapted to be connected to a source of high pressure power, and a pressure-operated plunger valve means having said connections, for controlling the application of increased pressure to such device, including an effective differential area and a hydraulic passageway, adapted to be controlled by a differential between the reaction of an intermittently acting movable body of liquid producing the increased pressure applied to such device and the primary pressure through which valve means the primary pressure and the high pressure pass.

EDWARD A. ROCKWELL.

REFERENCES CITED

The following references are of record in the file of this patent:

UNITED STATES PATENTS

| Number | Name | Date |
|---|---|---|
| 1,333,660 | Hutchins | Mar. 16, 1920 |
| 1,903,973 | Boughton | Apr. 18, 1933 |
| 1,983,884 | Hele-Shaw | Dec. 11, 1934 |
| 2,000,187 | Oliver | May 7, 1935 |
| 2,009,515 | Pardee | July 30, 1935 |
| 2,029,096 | Doyle | Jan. 28, 1936 |
| 2,239,481 | Christensen | Apr. 22, 1941 |
| 2,260,490 | Stelzer | Oct. 28, 1941 |

FOREIGN PATENTS

| Number | Country | Date |
|---|---|---|
| 777,932 | France | Dec. 15, 1934 |
| 835,760 | France | Oct. 3, 1938 |